United States Patent [19]

Dumont

[11] Patent Number: 5,345,071

[45] Date of Patent: Sep. 6, 1994

[54] SHOPPER'S PURCHASE MONITORING DEVICE

[76] Inventor: Charles Dumont, P.O. Box 1409, Old Parham Rd., St. John's, Antigua

[21] Appl. No.: 36,970

[22] Filed: Mar. 25, 1993

Related U.S. Application Data

[63] Continuation-in-part of Ser. No. 903,716, Jun. 23, 1992, abandoned, which is a continuation-in-part of Ser. No. 873,770, Apr. 27, 1992, abandoned.

[51] Int. Cl.$^5$ .............................................. G06K 7/10
[52] U.S. Cl. .................... 235/383; 235/462; 235/472; 364/709.02; 340/572
[58] Field of Search ............... 235/462, 472, 383; 364/709.01, 709.02, 464.01; 186/52, 59, 61; 156/541, DIG. 48; 340/572

[56]     References Cited

U.S. PATENT DOCUMENTS

| | | | |
|---|---|---|---|
| 4,071,740 | 1/1978 | Gogulski | 235/431 |
| 4,373,133 | 2/1983 | Clyne et al. | 235/383 |
| 4,528,638 | 7/1985 | Hatta et al. | 364/709.02 |
| 4,929,819 | 5/1990 | Collins, Jr. | 235/383 |
| 4,959,530 | 9/1990 | O'Connor | 235/383 |
| 5,013,896 | 5/1991 | Ono | 235/381 |
| 5,047,614 | 9/1991 | Bianco | 235/385 |
| 5,059,951 | 10/1991 | Kaltner | 340/572 |
| 5,192,854 | 3/1993 | Counts | 235/381 |

FOREIGN PATENT DOCUMENTS

| | | |
|---|---|---|
| 3-015993 | 1/1991 | Japan. |
| 3-148798 | 6/1991 | Japan. |
| 3-232079 | 10/1991 | Japan. |

*Primary Examiner*—Davis L. Willis
*Assistant Examiner*—Edward H. Sikorski
*Attorney, Agent, or Firm*—Malloy & Malloy

[57]     ABSTRACT

A purchase monitoring device, to be used by a shopper in a self-service store having items with bar codes which identify the item and its price, the device including primarily a portable handset having a bar code scanner which enables pricing and identification data of a selected item to be displayed on an LED display of the handset. Through selective use of a price check button, a purchase button, and a return button, the price of the item may be checked, added to a running total of purchase items, or removed from a running total of purchased items. During scanning of an item, a three headed roller selectively designates the item as a purchase item or as a non-purchase item by marking the bar code with either a red or a green line, so the purchase items can be quickly verified. Alternatively, the roller may change the state of a polarized metallic strip included with the bar code. The list of purchase items is stored within the handset for subsequent transfer to a data reception register of the store for payment.

18 Claims, 2 Drawing Sheets

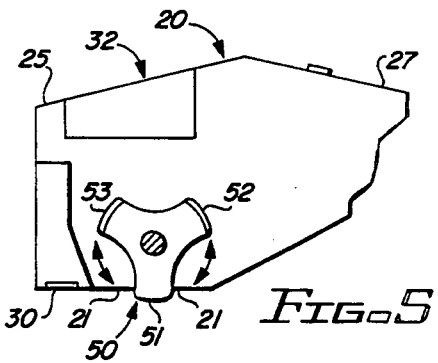
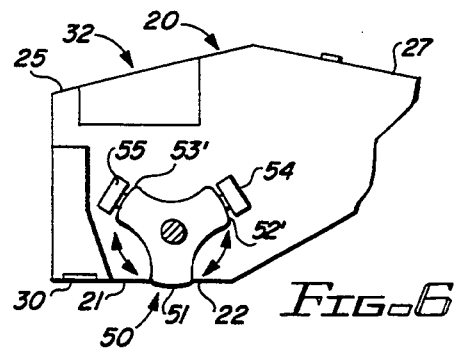
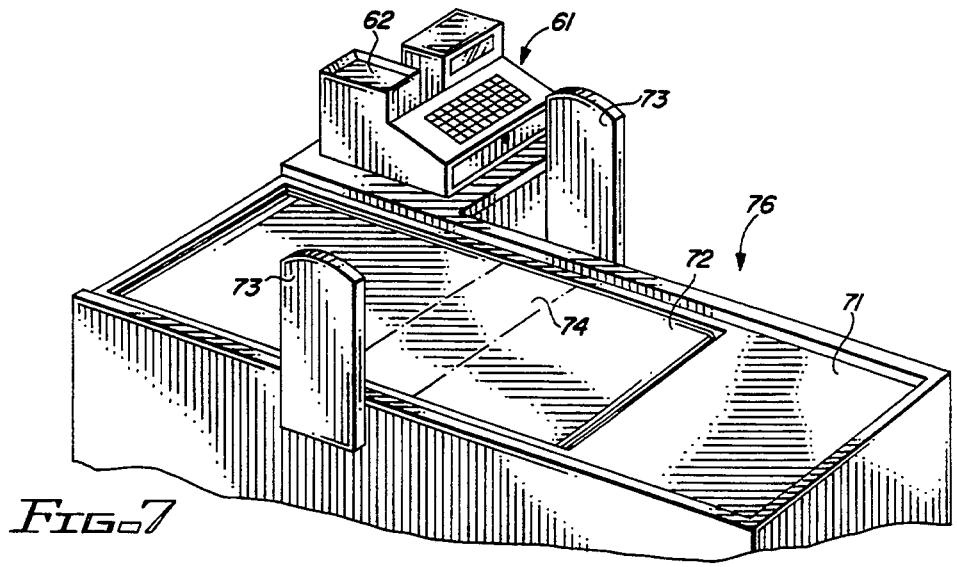
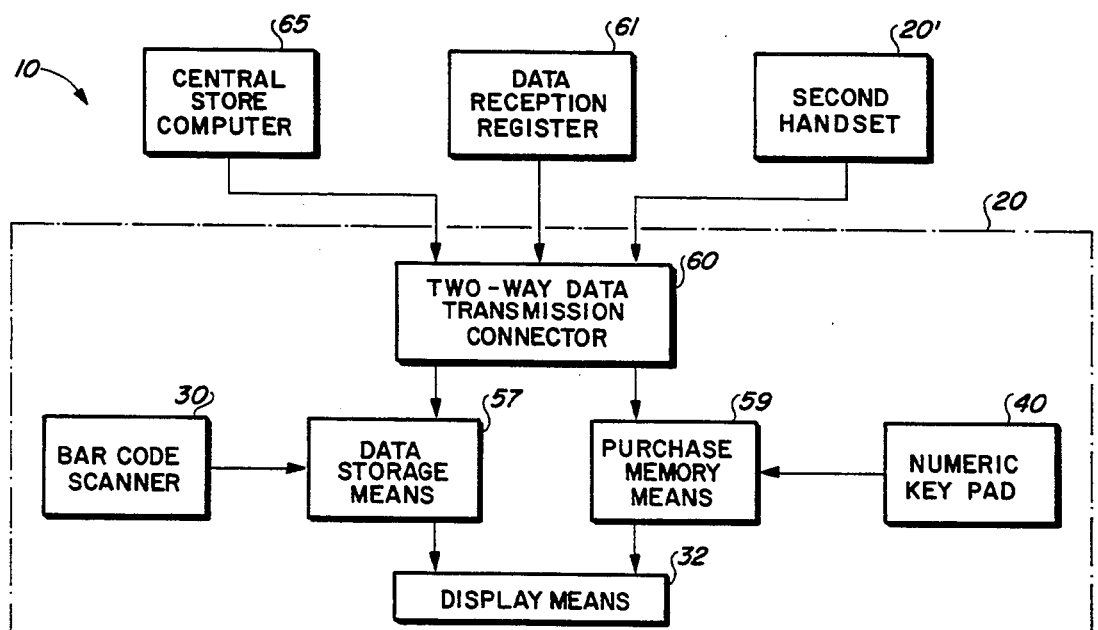

SHOPPER'S PURCHASE MONITORING DEVICE

This application is a continuation-in-part to the application filed Jun. 23, 1992 and given Ser. No. 07/903,716, abandoned, which is a continuation-in-part to the application filed Apr. 27, 1992 and given Ser. No. 07/873,770, abandoned.

BACKGROUND OF THE INVENTION

1. Field of the Invention

The present invention relates to a purchase monitoring device, to be used by a shopper in a self-service store to scan the price of select items and designate, when desired, that the item is a purchase item, and to store a list and running total of the purchase items for subsequent transfer to a data reception register for verification and payment, thereby providing an effective means of enabling users to be aware of how much they are spending in order to help them to stick to a budget and to expedite the store checkout procedures by not requiring individual checkout scanning of each item.

2. Description of the Prior Art

When shopping a self-service store such as a supermarket, consumers often encounter a number of inconveniences. One of these inconveniences includes difficulty in determining the price of an object to be purchased. This difficulty is a result of recent technology which enables the bar code of an item to be scanned at the cash register, thereby eliminating the necessity for individual price tags on each item, and only requiring that a price and item description appear on a shelf where the item is stocked. Unfortunately, prices often change due to promotions and the like, and are sometimes difficult to identify with regard to the prices displayed on the shelves. A further difficulty encountered at these stores involves the need of many customers to stick to a predetermined, precise budget, thereby necessitating that the cost of items to be purchased be calculated and known before checkout to avoid delays or embarrassment as a result of a deficiency of funds. Finally, the most obvious difficulty all consumers encounter in large self-service stores such as supermarkets is the endless waiting in line, waiting for all items to be purchased to be scanned and paid for. These difficulties are illustrated by the invention of the devices such as those recited in Bianco, U.S. Pat. No. 5,047,614, Collins, Jr., U.S. Pat. No. 4,929,819, Clyne, et al., U.S. Pat. No. 4,373,133, and O'Connor, U.S. Pat. No. 4,959,530, which utilize scanning of bar codes by individuals. These devices, however, do not provide the flexibility of allowing a person to merely check the price of an item, or select to purchase the item, or select to return the item after selection as a purchase item. Further, these inventions are not structured to provide that a scanned item itself be clearly indicated as a purchase item. Additionally, none of the items in the prior art enable an individual to maintain an accurate and up-to-date comparison of their actual purchases and their budget by clearly indicating the total purchase amount at all times.

The present invention is designed precisely to meet the needs of consumers as well as stores, and make the shopping experience more efficient and more enjoyable. Particularly, the present invention incorporates the use of existing bar code scanning technology which a majority of stores already employ, thereby requiring no adaptation of the store's computer pricing techniques. Additionally, the present invention enables the buyer to keep a constant update of how much is being spent thereby assisting the maintaining of a budget when items are selected to be purchased or returned. Most importantly, the present device enables the checkout process to be highly expedited through an easily adapted data transmission which provides for all purchase data collected by each consumer to be quickly and easily transmitted to a register, thereby requiring only a rapid, cursory examination of the products to determine if they are properly designated as a purchase item. The present invention is a complete system which will greatly assist consumers and store owners alike since it is easily adapted for use and can be easily and non-complicatedly employed by the average consumer. Currently in the art, multiple devices and procedures would be required to provide only a few of the functions of the device of the present invention and none allow a method of shopping as is possible utilizing the present invention.

SUMMARY OF THE INVENTION

The present invention is directed towards a purchase monitoring device to be used by a shopper in a self-service store. Most self-service stores include items having bar codes thereon which may be scanned to identify the item and a price thereof, and the device of the present invention utilizes this technology. The device of the present invention primarily includes a portable handset which has a lightweight exterior casing. This exterior casing includes a distal front face, a distal rear face, a proximal front face, and a proximal rear face, disposed so as to make the handset easy to grasp and utilize. Contained within the handset are data storage means which store pricing and identification data corresponding individual bar codes of store items. A bar code scanner, which is disposed in scanning position in the distal front face of the casing, is adapted to scan an item's bar code and correspondingly identify its information stored within the data storage means. The bar code scanner is positioned such that upon passage of the distal front face of the handset over the selected item its bar code is scanned. Additionally, the handset includes purchase designation means and non-purchase designation means disposed in the distal front face of the casing. The purchase designation means are adapted to selectively designate an item over which the distal front face of the handset is passed as a purchase item which is sought to be purchased. The non-purchase designation means similarly selectively designates one of the items previously designated as a purchase item as a non-purchase item upon passage of the distal front face of the handset thereover. The purchase designation means and non-purchase designation means are adapted to be selectively utilized simultaneously with the passage of the bar code scanner over the bar code on the selected item such that a single pass of the distal front face of the handset over the item is necessitated. Disposed in a distal rear face of the casing are display means which display pricing and identification information thereon. Further contained within the handset are purchase memory means. The purchase memory means are adapted to store the particular pricing and identification of data of each of the items designated as a purchase item by the shopper. Further, the purchase memory means adds all of the prices of the purchase items entered therein so as to provide a total purchase amount displayed on the display means, thereby providing a shopper with a constant update of how much they are spending. Positioned on a proximal rear face of the casing of the handset are a plurality of buttons. These buttons include a price check button, a purchase button, and a return button. The price check button is adapted to be pushed during passage of the distal front face of the handset over the bar code of a selected item such that the pricing and identification data corresponding the item will be retrieved from the data storage means and briefly displayed on the display means to enable a shopper to verify the price and identity of the selected item. The purchase button is also adapted to be pushed during passage of the distal front face of the handset over the bar code of the selected item, and when it is pushed during this passage, the purchase designation means are simultaneously caused to designate the item scanned as one of the purchase items, thereby retrieving the pricing and identification data of that selected item, briefly displaying it on the display means, and entering it into the purchase memory means for storage and addition to the running total purchase amount. The return button is adapted to be pushed during passage of the distal front face of the handset over the bar code of a select one of the purchase items so as to cause the non-purchase designation means to designate that purchase item as a non-purchase item and to retrieve the pricing and identification data corresponding that purchase item from the data storage means for matched removal of that pricing and identification data from the purchase memory means, accordingly updating the total purchase amount. Disposed on the front proximal face of the casing of the handset is a numeric key pad. The numeric key pad enables entry by the shopper of a budget amount corresponding a maximum amount of money which can be spent by the shopper at the store. This budget amount is stored in the purchase memory means and is displayed on the display means, thereby enabling a user to constantly refer to the budget amount in determining how much more can be purchased. The handset, which includes its own independent power source, includes a two-way data transmission connector in the proximal front face of the casing. This connector is particularly adapted to enable updated pricing and identification data to be transmitted from a central store computer to the data storage means within the handset by connecting the handset through the two-way data transmission connector to the store's central computer. Additionally, the two-way data transmission connector is structured and disposed to enable the pricing and identification data corresponding all of the purchase items to be transmitted from the purchase memory means to a data reception register at the checkout station of the store so as to provide an itemized receipt of the purchase items to be printed. The data reception register is generally positioned at a purchase confirmation station of the device located at the store's checkout station. The purchase confirmation station is adapted to enable an employee of the store to quickly verify that all items represented by the shopper as purchase items are in fact purchase items, without the need to individually scan each item or perform a detailed price check and verification on every item.

It is an object of the present invention to provide a device which will enable shoppers to quickly and easily determine the price of a selected item.

It is a further object of the present invention to provide a purchase monitoring device which will keep an accurate and updated total purchase amount, thereby enabling a user to constantly know how much money they have spent on the items selected during their shopping.

A further object of the present invention is to enable a user to quickly and easily compare the total purchase amount of items to be bought with a maximum budget amount which they have pre-selected, thereby assuring that the shopper will know how many items they can afford to actually purchase.

Still another object of the present invention is to provide a purchase monitoring device which can be easily updated to assure that current pricing and identification data corresponding item bar codes is always utilized.

An additional object of the present invention is to provide a purchase monitoring device which will significantly expedite the checkout procedure by eliminating the need for a store clerk to individually scan each item to be purchased at the checkout station, but merely necessitates that the store clerk provide a cursory, rapid verification of all items as they are quickly transferred from a user's shopping cart to a bagging area.

Yet another object of the present invention is to provide a purchase monitoring device which can easily transfer information regarding the items to be purchased to a store data reception register where a receipt may be printed and payment received.

A further object of the present invention is to provide a purchase monitoring device which is easy to utilize by any store customer and will not require complex or costly adaptation of existing store pricing systems which already utilize bar codes and bar code scanners to identify and price items.

BRIEF DESCRIPTION OF THE DRAWINGS

For a fuller understanding of the nature of the present invention, reference should be had to the following detailed description taken in connection with the accompanying drawings in which:

FIG. 5 is a cross-sectional view of a proximal end of the handset of the present invention illustrating a first embodiment of the purchase and non-purchase designation means.

FIG. 6 is a cross-sectional view of the proximal end of the handset of the present device illustrating a second embodiment of the purchase and non-purchase designation means.

FIG. 7 is a perspective view of a checkout station of the store utilizing the purchase confirmation station and data reception register of the device of the present invention.

FIG. 8 is a schematic block diagram illustrating the functioning of the device of the present invention.

Like reference numerals refer to like parts throughout the several views of the drawings.

DETAILED DESCRIPTION OF THE PREFERRED EMBODIMENT

Figure 1:
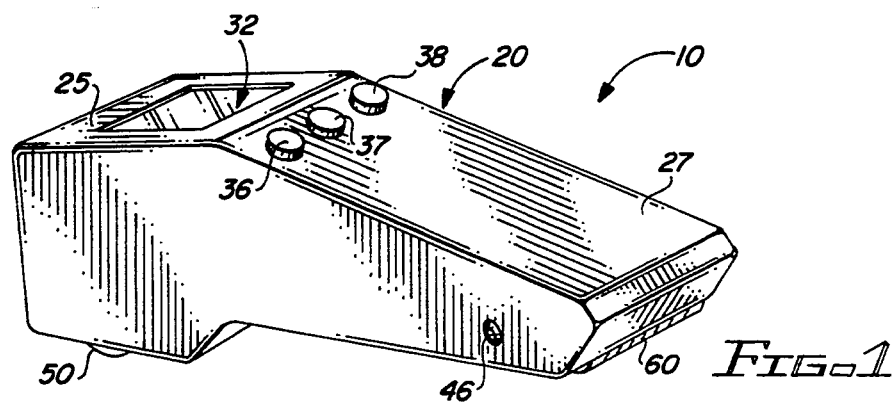
FIG. 1 is a perspective view of the handset of the device of the present invention.
Figures 2, 3:
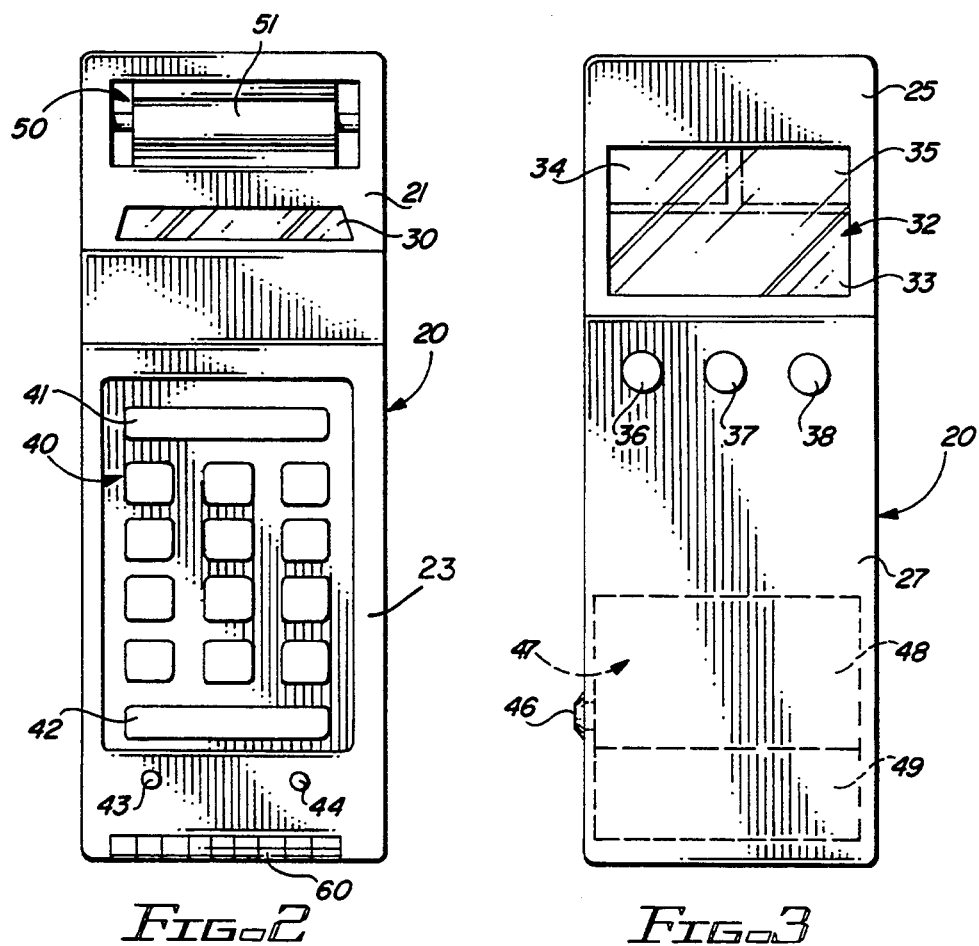
FIG. 2 is a top view of the front face of the handset of the device of the present invention.
FIG. 3 is a top view of the rear face of the handset of the present invention.
Figure 4:
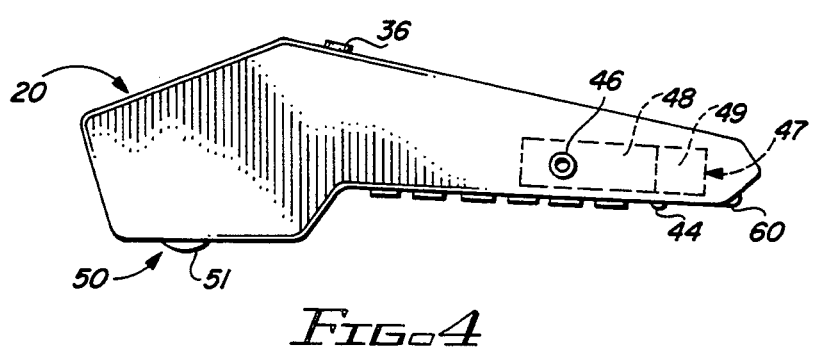
FIG. 4 is a side view of the handset of the present invention.

Shown throughout FIGS. 1–8, the present invention is directed towards a purchase monitoring device, generally indicated as 10. The monitoring device 10 is adapted to be used by a shopper in a self-service store of the type having numerous items with bar codes thereon to identify the item and a price thereof. The monitoring device includes primarily a portable handset 20, illustrated in FIGS. 1-6. The handset 20 includes a durable exterior casing having a distal front face 21, a proximal front face 23, a distal rear face 25, and a proximal rear face 27 oriented to facilitate holding and use by the shopper. Contained within the handset 20 are data storage means 57. These data storage means 57 are adapted specifically to store information relating bar codes to appropriate identification and pricing data. Disposed in the distal front face 21 of the handset 20 is a bar code scanner 30. The bar code scanner 30 is a standard-type scanning device which reads and recognizes bar code information on an item when the distal front face 21 of the handset 20 is passed over the bar code of the item. Further disposed in the distal front face 21 of the handset 20, adjacent the bar code scanner 30, is a three headed roller 50 which includes a first face, a second face, and a third face, only one of the faces being exposed at one time through an opening 22 in the proximal front face 21 of the handset 20. The roller 50 is adapted to contact the bar code of an item upon passage of the front distal face 21 of the handset 20 over the bar code of the item so as to scan the item with the bar code scanner 30. The first face 51 of the roller 50 is normally in an exposed position protruding through the opening 22 in the distal front face 21 of the handset 20 and has a neutral effect. The second face of the roller 50 includes purchase designation means 53 thereon which are specifically adapted to selectively designate the select item over which the distal front face 21 of the handset 20 passes, as a purchase item which can be easily identified as such at a checkout station. The third face of the three headed roller 50 includes non-purchase designation means 52 thereon adapted to selectively designate one of the previously selected and designated purchase items as a non-purchase item which is no longer to be bought by the shopper. Passage of the particular exposed face of the three headed roller 50 over the scanned item is adapted to be simultaneous with the scanning by the bar code scanner 30, thereby assuring that a shopper cannot solely scan an item. The orientation of the three headed roller 50 through the opening 22 in the distal front face 21 of the handset 20 is directed by a plurality of buttons 36, 37, and 38 disposed in the proximal rear face 27 of the handset 20. The buttons include a price check button 36, a purchase button 37, and a return button 38, one of the buttons necessarily being pressed for the bar code scanner 30 to effectively scan the bar code of the selected item. When the price check button 36 is pressed during passage of the distal front face 21 over the bar code of the selected item, the neutral, normally exposed, first face 51 of the roller 50 remains exposed for rolling passage over the bar code of the item and the bar code scanner 30 reads the bar code such that the corresponding pricing and identification data relating to the scanned item will be retrieved from the data storage means 57 and momentarily displayed on display means 32 positioned in the distal rear face 25 of the handset 20. The display means 32 include an LED display which is conveniently disposed for quick reference by the shopper. When the purchase button 37 on the handset 20 is pushed during passage of the distal front face 21 over the bar code of a selected item, the second face of the roller 50 having the purchase designation means 53 thereon is rotated to the opening 22 for rolling passage over the selected item. The selected face of the roller 50 is rotated to the opening 22 upon pushing one of the select buttons either by electrical, mechanical, or magnetic actuation means, such as those normally utilized in the art. Simultaneous with rolling passage of the purchase designation means 53 over the bar code of the selected item, so as to designate the item as a purchase item, the bar code scanner 30 reads the bar code on the item and retrieves the pricing and identification data corresponding the item from the data storage means 57 and, while displaying the information briefly on the display means 32, enters the data into purchase memory means 59 contained within the handset 20. The purchase memory means 59 are adapted to store the pricing and identification data of all of the purchase items selected by the shopper, and sums the prices to maintain a running, total purchase amount of all purchase items to be displayed on the display means 32 such that the shopper may always be able to refer to the amount of money they are spending. Upon pressing the return button 38 in the handset 20, during passage of the distal front face 21 of the handset 20 over a select item, which has previously been designated as a purchase item by the purchase designation means 53, the third face of the roller 50 having the non-purchase designation means 52 thereon rotates to an exposed position through the opening 22 in the distal front face 21 of the handset 20 for rolling passage over the bar code of the selected purchase item. Simultaneous with passage of the non-purchase designation means 52 over the bar code of the selected purchase item, the bar code scanner 30 identifies the bar code and retrieves the corresponding pricing and identification data from the data storage means 57 for matched removal of the pricing and identification data corresponding the previously selected purchase item from the purchase memory means 59 such that the price of the item will be removed from the running total purchase amount simultaneous with the designation of the item as a non-purchase item and no longer a purchase item.

Disposed in a proximal front face 23 of the handset 20 is a numeric key pad 40. The numeric key pad 40 is adapted to allow entry of a maximum budget amount for storage within the purchase memory means 59. The budget amount is the maximum amount of money which the shopper wishes to spend at the store, and for ease of comparison is displayed on the display means 32. Additionally, a first confirmation button 41 is disposed on the proximal front face 23 of the handset 20 to indicate that a number entered is in fact the budget amount to be stored within the purchase memory means 59 and displayed on the display means 32. For convenience to a shopper, the display means 32 includes three separate display fields 33, 34, and 35, in the preferred embodiment. These display fields include a large primarily display field 33 wherein the pricing and identification data corresponding an item which has just been scanned is displayed after scanning for reference and verification by the shopper. A second, smaller display field 34 is adapted to perpetually display the updated total purchase amount as stored and calculated by the purchase memory means 59. Finally, the third display field 35 is adapted to display the budget amount which was entered by means of the numeric key pad 40 and stored within the purchase memory means 59 such that the user can consistently refer to the budget amount in field 35 for comparison with the total purchase amount displayed in field 34. As a further assurance that the shopper is aware that the budget amount has reached the total purchase amount, an indicator light 43 is included to signal the user that the amounts have been equaled. Further disposed on the proximal front face 23 of the handset 20 is a second confirmation button 42 which when pressed after scanning an item provides for display a price per unit weight ratio of the scanned item as stored within the data storage means for the scanned item. This price per unit weight ratio enables a shopper to compare values without the need to independently calculate the ratio from the price of the item and the weight displayed on the item container.

Turning to FIGS. 5 and 6, the purchase designation means 53 and non-purchase designations means 52 include two preferred embodiments. In the preferred embodiment, illustrated in FIG. 5, the bar code of each item includes a polarized metallic strip. The purchase designation means 53 on the second face of the roller 50, includes a first polarizing magnetic member, and the non-purchase designation means 52 on the third face of the roller 50 includes a second polarizing magnetic member. Initially, the metallic strip on the item is set to a non-purchase polarization, preferably a positive polarization. Upon rolling passage of the first polarizing magnetic member of the purchase designation means 53 over the bar code, and accordingly the strip, the polarization of the strip is changed to its opposite, a negative polarization, thereby designating the item as a purchase item because of the polarization of the strip. Similarly, the second polarizing magnetic member of the non-purchase designation means 52 includes a polarization effect opposite that of the purchase designation means 53 such that when it passes over the bar code and strip of an item previously designated as a purchase item and accordingly having had the polarization of the strip changed to a negative polarization, the polarization of the strip will change to the positive non-purchase polarization which can be easily identified upon checkout. Illustrated in FIG. 6, a second embodiment of the purchase designation means 53' and non-purchase designation means 52' includes the use of stamping strips disposed in the second and third faces of the roller 50. The purchase designation means 53' include a green ink stamping strip which upon rolling passage over the bar code of a selected item, leaves a green line across the bar code of the item to designate the item as a purchase item. In order to assure that the green ink stamping strip always includes sufficient ink, when the second face of the roller 50 is in its normally retracted position, the green ink stamping strip 53' is disposed in ink recharging contact with a green ink reserve 55 disposed within the handset 20. Similarly, the non-purchase designation means 52' include a red ink stamping strip adapted to place a red line on the bar code of the item upon rolling passage over the bar code. The red ink stamping strip 52' remains charged by being in ink recharging contact with a red ink reserve 54 disposed within the handset 20 when the third face of the roller is in its normally retracted position. The designation of an item as a purchase item or non-purchase item utilizing this second embodiment of the purchase designation means 53' and non-purchase designation 52' relates to the quantity and ratio of green and red lines on the bar code of the item. If there are an equal number of green and red lines, or there are no lines, the item is a non-purchase item, and if there is one more green line than there are red lines, the item is a purchase item. Checking of the appropriate designation on the item is performed at a purchase confirmation station 76 located at the checkout station of the store. The purchase confirmation station 76 includes a standard unloading counter 71 having a conveyor belt 72 disposed therein. When utilizing the second embodiment of the purchase and non-purchase designation means 53' and 52', confirmation and quick verification that all items purported to be purchase items are in fact purchase items is performed solely by an employee of the store who performs a cursory examination of all items as they pass on the conveyor belt to verify the existence of more green lines than red lines. This procedure is significantly quicker than scanning each individual item by the employee as only a rapid cursory check needs to be performed. When utilizing the first embodiment of the purchase and non-purchase designation means 53 and 52, the purchase confirmation station 76, as illustrated in FIG. 7, includes detection means 73, preferably in the form of polarization indicators, spanning the conveyor belt 72 such that all items must pass through the detection means 73. The detection means 73 are structured to detect any items having a positive non-purchase polarization. If one of such items having a positive non-purchase polarization is detected, the detection means 73 cause the conveyor belt 72 to immediately stop thereby identifying all items within a specifically delineated designation detection area 74 between the detection means 73 as items which must be independently verified by the employee by checking them against a listing of all purchase items contained within the purchase memory means 59 in handset 20.

In order to facilitate the printing of a receipt and various other requirements of shopping, the handset 20 includes a two-way data transmission connector 60 in the proximal front face 23 of the handset 20. As illustrated in FIG. 8, the two-way data transmission connector 60 is adapted to be connected to the central store computer 65, prior to use, for transmittal of updated pricing and identification data corresponding items within the store to the data storage means 57 of the handset 20, thereby assuring that updated information relating to items within the store is maintained during sales, promotions, and the like. Additionally, the two-way data transmission connector 60 functions to transmit all pricing and identification data stored within the purchase memory means 59, and corresponding all purchase items, to a data reception register 61 located with the purchase confirmation station 76 at the store check out station. The data reception register 61 include a specially adapted handset receptacle 62 wherein a shopper's handset 20 is positioned upon checkout. The receptacle 62 is adapted to place the handset 20 in transmitting connection with the data reception register 61 such that the information stored within the purchase memory means 59 can be transmitted to the register 61 for printing of an itemized receipt which facilitates verification and receipt of payment at the register 61.

In order to be fully portable, the handset 20 includes an independent power source contained therein. Preferably, the power source 47 includes a primary power source 48 and an auxiliary power source 49. The primary power source 48 is in the form a rechargeable battery pack disposed within the casing of the handset 20 which through an externally accessible power input plug 46 is adapted to be recharged after it runs low. The auxiliary power source 49 includes a reserve battery which enables the handset 20 to remain powered for a short period of time after the primary power source 48 has been exhausted. In order to indicate that the primary power source 48 is running low, an indicator light 44 is disposed on a proximal front face 23 of the handset 20 to indicate to the shopper that the primary power source 48 is running low and the situation should be remedied. The auxiliary power source 49 is highly beneficial because it enables a shopper, upon noticing that the primary power source 48 is running low, to either transmit all data stored within the purchase memory means 59 to the data reception register 61, or to a second fully charged handset 20' for continued shopping without losing the previously scanned purchase data.

The present invention as described illustrates the preferred embodiments at the time of invention and variations consistent with the intent claimed herein and the doctrine of equivalents should also be included within the scope of this invention.

Now that the invention has been described,

What is claimed is:

1. To be used by a shopper in a self-service store having items including bar codes thereon to identify the item and a price thereof, a purchase monitoring device comprising:

a portable handset, said handset including an exterior casing having a distal front face, a distal rear face, a proximal front face, and a proximal rear face, data storage means within said handset structured and disposed to store pricing and identification data corresponding individual bar codes, a bar code scanner disposed in said distal front face of said casing so as to scan the bar code on a selected item upon passage of said distal front face of said handset thereover, purchase designation means in said distal front face of said casing structured and disposed to selectively designate the select item over which said distal front face of said handset is passed as a purchase item sought to be purchased, non-purchase designation means in said distal front face of said casing structured and disposed to selectively designate one of said purchase items, upon passage of said distal front face of said handset thereover, as a non-purchase item which is not to be purchased, display means disposed in said distal rear face of said casing and being structured and disposed to display pricing and identification information thereon, purchase memory means structured and disposed to store the pricing and identification data of each of said purchase items selected by the shopper, a plurality of buttons in said proximal rear face of said casing of said handset, said buttons including a price check button structured and disposed to be pushed during passage of said distal front face of said handset over the bar code of the selected item such that the pricing and identification data corresponding the selected item will be retrieved from said data storage means and briefly displayed on said display means, thereby enabling the shopper to verify the price and identity of the selected item, said buttons further including a purchase button, said purchase button being structured and disposed to be pushed during passage of said distal front face of said handset over the bar code of the selected item such that said purchase designation means will designate the select item as one of said purchase items and such that the pricing and identification data corresponding the selected item will be retrieved from said data storage means for brief display on said display means and entry into said purchase memory means, said buttons also including a return button, said return button being structured and disposed to be pushed during passage of said distal front face of said handset over the bar code a select one of said purchase items such that said non-purchase designation means will designate said purchase items as one of said non-purchase items and such that the pricing and identification data corresponding said purchase item will be retrieved from said data storage means for matched removal of the pricing and identification data from said purchase memory means, said purchase memory means being further structured and disposed to add the price of all of said purchase items entered therein so as to provide a total purchase amount to be displayed on said display means, said handset further including a numeric key pad disposed in said front proximal face of said casing, said numeric key pad being structured and disposed to enable entry by the shopper of a budget amount corresponding a maximum amount of money to be spent by the shopper at the store, said budget amount being stored in said purchase memory means and displayed on said display means, a power source in said handset, a two-way data transmission connector in said proximal front face of said casing, said connector being structured and disposed to enable updated pricing and identification data to be transmitted from a central store computer to said data storage means within said handset, and being structured and disposed to enable pricing and identification data corresponding said purchase items to be transmitted from said purchase memory means to a data reception register at a checkout station of the store where an itemized receipt of said purchase items is printed, a purchase confirmation station at said checkout station of said store, said purchase confirmation station being structured and disposed to enable an employee of the store to quickly verify that all items represented by the shopper as purchase items are in fact purchase items, an opening in said proximal front face of said casing adjacent said bar code scanner, and said handset further including a three headed roller, said roller including a first face, a second face, and a third face, only one of said faces being disposed at one time through said opening in said proximal front face of said casing adjacent said bar code scanner, said exposed one of said faces being disposed for rolling passage over the bar code of the selected item upon passage of said proximal front face of said casing, and accordingly, said bar code scanner, over the bar code of the selected item.

2. A purchase monitoring device as recited in claim 1 wherein said handset further includes at least one confirmation button disposed in said proximal front face of said casing, said confirmation button being structured and disposed to be pushed and accordingly indicate that a number being entered on said key pad is said budget amount.

3. A purchase monitoring device as recited in claim 1 wherein said handset includes a second confirmation button disposed in said proximal front face of said casing, said second confirmation button being structured and disposed to be pushed and accordingly cause a price per unit weight ratio of a previously scanned item, as stored in said data storage means, to be displayed on said display means.

4. A purchase monitoring device as recited in claim 1 wherein said display means includes an LED display.

5. A purchase monitoring device as recited in claim 1 wherein said handset includes signaling means structured and disposed to indicate when said budget amount has been equaled by said total purchase amount.

6. A purchase monitoring device as recited in claim 1 wherein said power source includes a primary power source and an auxiliary power source.

7. A purchase monitoring device as recited in claim 6 wherein said auxiliary power source includes a reserve battery structured and disposed to enable data stored within said purchase memory means of a first one of said handsets to be stored for subsequent transfer through said data transmission connector to said data reception register or a second one of said handsets when said primary power source in said first one of said handsets is exhausted.

8. A purchase monitoring device as recited in claim 7 wherein said handset includes a battery low warning signal structured and disposed to indicate when said primary power source is low in charge.

9. A purchase monitoring device as recited in claim 8 wherein said primary power source includes a rechargeable battery pack disposed within said casing, said battery pack including an externally accessible power input plug structured and disposed to enable recharging of said battery pack.

10. A purchase monitoring device as recited in claim 1 wherein said first face of said roller is normally said exposed one of said faces and has no effect upon rolled passage over the bar code of the selected item.

11. A purchase monitoring device as recited in claim 10 wherein said second face of said roller includes said purchase designation means therein, said second face being rotated to be said exposed one of said faces during pushing of said purchase button.

12. A purchase monitoring device as recited in claim 11 wherein said third face of said roller includes said non-purchase designation means therein, said third face being rotated to be said exposed one of said faces during pushing of said return button.

13. A purchase monitoring device as recited in claim 12 wherein said purchase designation means includes a green ink stamping strip structured and disposed to place a green line across the bar code of the selected item upon rolling passage of said second face of said roller over the bar code, said green ink stamping strip being structured and disposed to be in ink recharging contact with a green ink reserve disposed within said casing when said second face is in its normally retracted position.

14. A purchase monitoring device as recited in claim 13 wherein said non-purchase designation means includes a red ink stamping strip structured and disposed to place a red line across the bar code of the selected item upon rolling passage of said third face of said roller over the bar code, said red ink stamping strip being structured and disposed to be in ink recharging contact with a red ink reserve disposed within said casing when said third face is in its normally retracted position.

15. A purchase monitoring device as recited in claim 14 wherein said purchase confirmation station includes a conveyor belt upon which said purchase items are placed such that the employee of the store may make a cursory examination of each item to verify that it is a purchase item having more of said green lines than said red lines.

16. A purchase monitoring device as recited in claim 12 wherein said purchase designation means includes a first polarizing magnetic member structured and disposed to correspondingly polarize a polarized metallic strip disposed on the bar code of the selected item upon rolling passage of said second face of said roller over the bar code.

17. A purchase monitoring device as recited in claim 16 wherein said non-purchase designation means includes a second polarized magnetic member having a polarization effect opposite that of said first polarized magnetic member and being structured and disposed to correspondingly polarize said polarized metallic strip on the bar code of the selected item upon rolling passage of said third face of said roller over the bar code.

18. A purchase monitoring device as recited in claim 17 wherein said purchase confirmation station includes a conveyor belt upon which said purchase items are placed and includes detection means, said conveyor belt passing through said detection means which are structured and disposed to detect said polarized metallic strips having a polarization corresponding said non-purchase designation means and accordingly stopping movement of said conveyor belt such that each of said purchase items within a designation detection area of said detection means can be independently verified by the store employee to assure that it truly is one of said purchase items.

\* \* \* \* \*